Oct. 19, 1948.  O. M. OWSLEY  2,451,509
TESTING DEVICE FOR SOUND PROJECTOR
Filed July 5, 1944  4 Sheets-Sheet 1
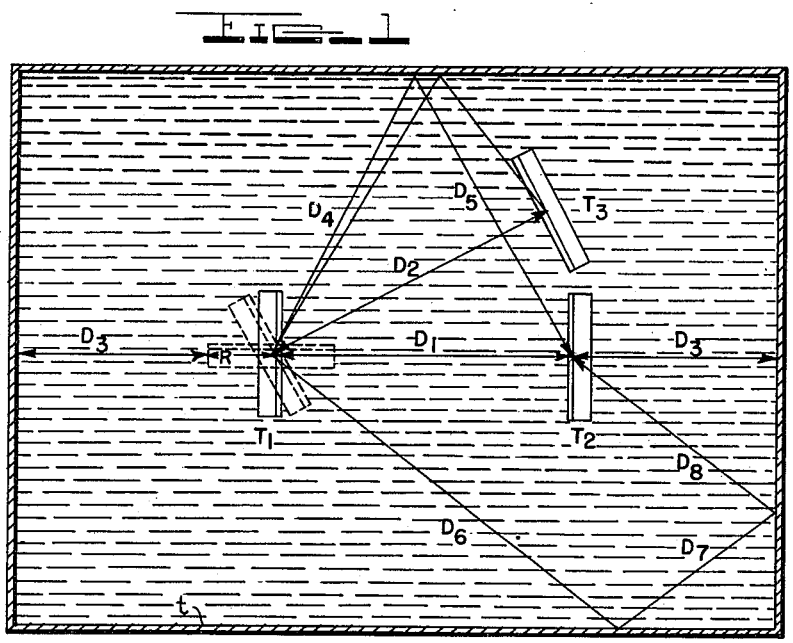
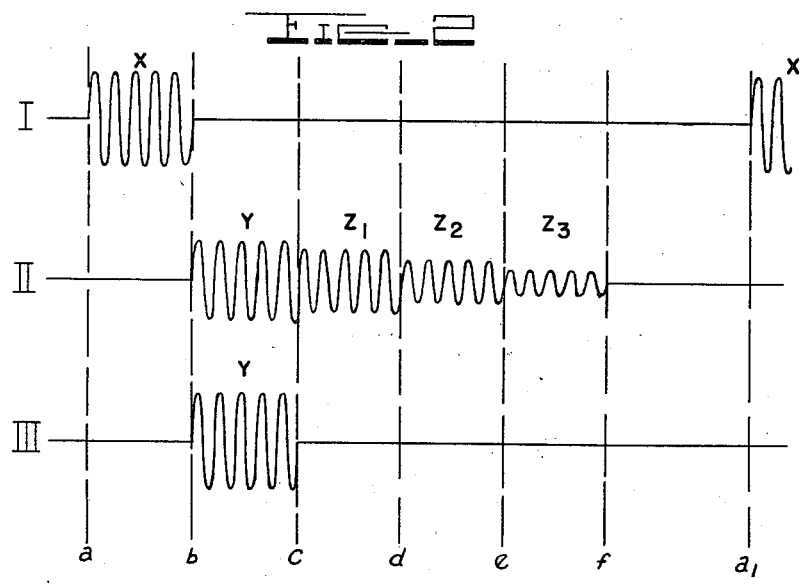
INVENTOR
OLLIE M. OWSLEY

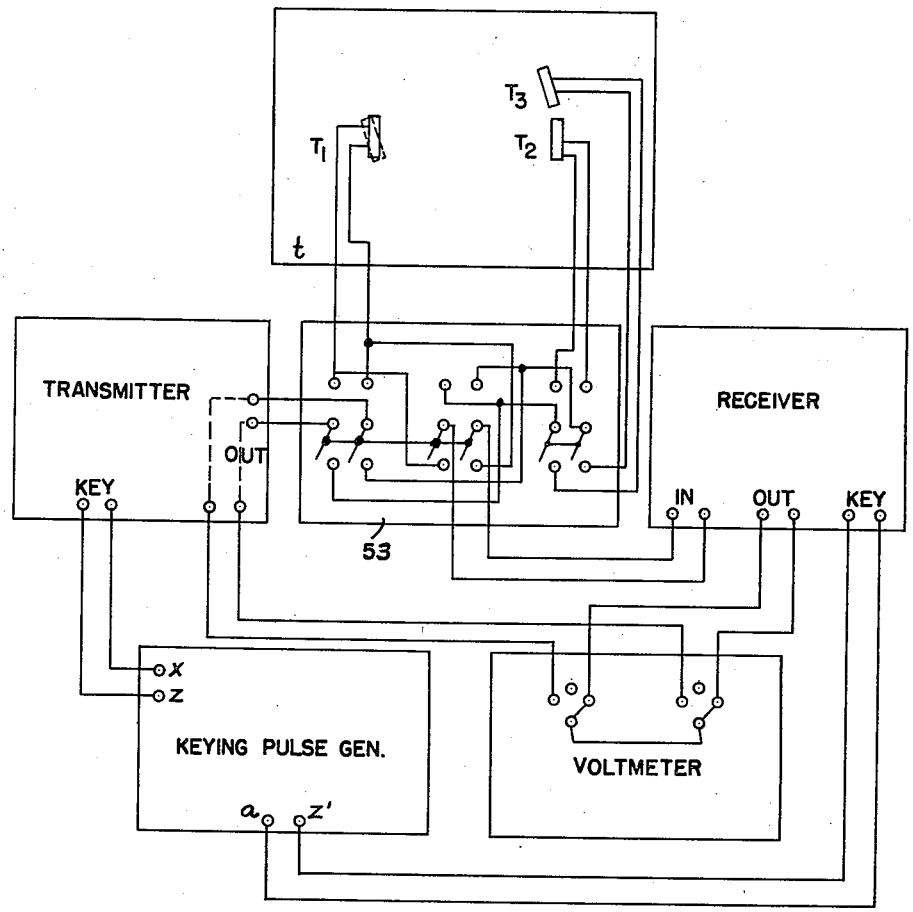

Oct. 19, 1948.　　　　O. M. OWSLEY　　　　2,451,509
TESTING DEVICE FOR SOUND PROJECTOR

Filed July 5, 1944　　　　　　　　　　　　　　4 Sheets-Sheet 3

Inventor
OLLIE M. OWSLEY

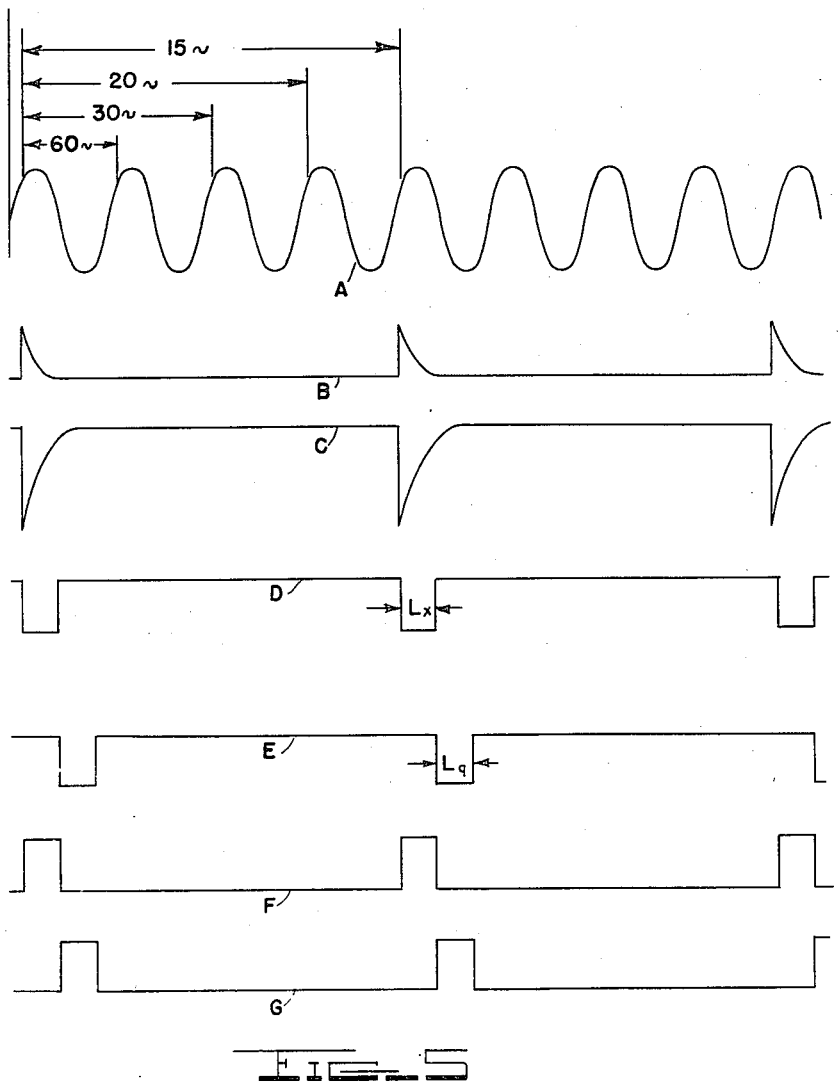

UNITED STATES PATENT OFFICE 2,451,509

TESTING DEVICE FOR SOUND PROJECTORS

Ollie M. Owsley, Alexandria, Va.

Application July 5, 1944, Serial No. 543,596

11 Claims. (Cl. 73—1)

(Granted under the act of March 3, 1883, as amended April 30, 1928; 370 O. G. 757)

This invention relates to the testing of sound equipment and more particularly underwater sound equipment.

It is necessary to test all underwater sound projectors or hydrophones in order to ascertain their characteristics for determining their suitability for use.

It is often undesirable or impossible to test such equipment at sea and various means have been proposed to permit this work to be undertaken in a tank. However, due to the fact that directly transmitted and reflected sound waves are both received and interfere with each other, none of these methods have been entirely successful.

It is an object of this invention to provide a method of and means for permitting the testing of sound equipment to be undertaken successfully in a space of limited dimensions.

More specifically it is an object of this invention to provide means for nullifying the effect of interference between directly transmitted and indirectly received or reflected sound pulses.

Another object of this invention is to provide a circuit for testing sound equipment which will obviate the necessity of using special sound absorbent linings in the testing tank or sound chambers used for testing such equipment.

These and other objects will become clear upon consideration of the following specification taken in connection with the accompanying drawings.

In accomplishing the objects of this invention, means are provided whereby the projector, whether a standard or that under test, is driven for a short interval and the hydrophone used as a sound pick up, whether under test or a standard, is excited for a similar short interval and is then cut off before any reflected waves can reach it.

Now, although this invention is equally applicable to the testing of sound producers and microphones for use in air, the remainder of the specification will be addressed to testing of underwater equipment.

Having thus briefly described my invention, attention is invited to the drawings in which:

Fig. 1 is a schematic diagram of a testing tank for operation in accordance with this invention.

Fig. 2 is a diagram for demonstrating the principles of the invention;

Fig. 3 is a schematic circuit diagram of an apparatus adapted to operate in accordance with this invention;

Fig. 5 is a diagram showing in detail the operation of the timing circuits shown in Fig. 4.

Figure 4:
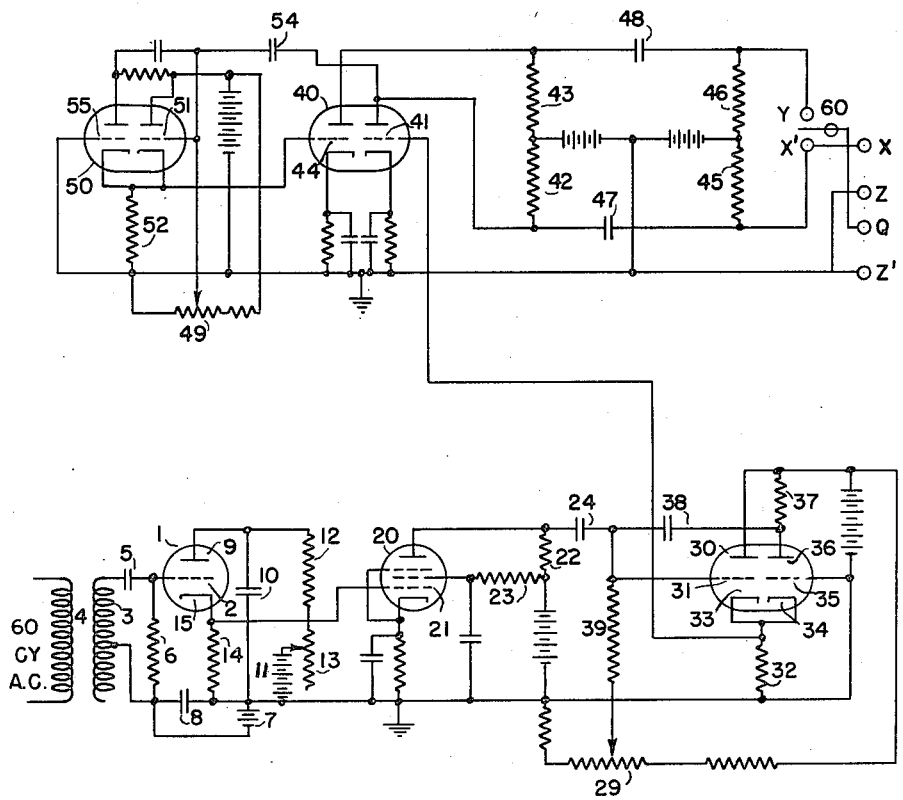
Fig. 4 is a circuit diagram of the timing circuits constituting a fundamental part of the invention.

Particular attention is now invited to Fig. 1 which shows a projector and hydrophone testing tank $t$, which may be of any suitable construction such as of metal, wood, or concrete, and which is filled with water.

A transducer $T_1$ is positioned on the longitudinal median line in the tank near one end and is mounted to permit rotation about a vertical axis as indicated. A second transducer $T_2$ is fixedly mounted on the median line near the other end of the tank at a distance $D_1$ from $T_1$ and a third transducer $T_3$ may also be mounted, as shown, if desired, at the same distance, $D_2$, from $T_1$.

The spacing $D_1$ between the transducer units $T_1$ and $T_2$ will depend on three factors, the largest of which determines the minimum distance.

The duration of a received C. W. pulse in this system cannot be greater than the time it takes the sound to pass between $T_1$ and $T_2$. Therefore the required time for satisfactory meter reading sets one limit upon $D_1$. This may be expressed by the formula:

$$D_1 = \frac{nc}{f} \text{ or } n\lambda$$

where:

$n$ = Number of cycles required for a satisfactory meter reading. (This is usually 5 or more cycles with a non-resonant projector under test.)
$c$ = velocity of sound in water,
$f$ = frequency, and
$\lambda$ = wavelength.

Where the frequency is below 15 kc., the above designated limit will probably control with projectors of normal size. With frequencies above 30 kc., the following equation must be observed:

$$D_1 \geq \frac{R^2}{\lambda}$$

where $R$ = the radius of the radiating face of the projector.

With frequencies of between 15 and 30 kc., the following equation must be met:

$$D_1 \geq 6R$$

The length of the tank must be at least great enough so that the reflected sound will arrive at the hydrophone from either end of the tank after the number of cycles of sound required for a satisfactory meter reading have been received. Thus:

$$D_3 \geq \frac{n\lambda}{2}$$

and the entire length of the tank, should not be less than $D_1 + R + n$.

The width of the tank should be such that $D_4 = D_5 = D_1 + R + n\lambda$ to insure that, for the shortest reflection path encountered, the reflected wave will arrive at the hydrophone after the required number of cycles of the direct sound wave for a satisfactory reading have been received. The width will be given by the following expression:

$$2\sqrt{\left(\frac{W}{2}\right)^2+\left(\frac{D_1}{2}\right)^2}=L$$

$$\sqrt{W^2+D_1^2}\geq L$$

$$W\geq\sqrt{L^2-D_1^2}$$

The depth of the water in the tank should equal the width of the tank.

Therefore assuming a frequency of 24 kc. and a hydrophone radius of 1 foot, the tank dimensions could be as small as 8 x 5.3' x 5.3' which it can be seen are quite moderate.

In addition to further consideration of Fig. 1, attention is invited to Fig. 2. In this figure curve I represents the impulses generated by a projector, as $T_1$, of Fig. 1. Curve II represents the waves impinging upon $T_2$ and curve III represents the waves which are utilized in accordance with this invention.

The transducer $T_1$ transmits pulses of say five cycles as shown at X in curve I between the time ordinates $a$ and $b$. These pulses which are transmitted at intervals of one-sixtieth, one-thirtieth, one-twentieth, or one-fifteenth of a second, are impressed upon transducer $T_2$ as shown at Y between ordinates $b$ and $c$ in curve II, after passing over the path $D_1$. The signal pulse is reflected as shown over the path $D_4$ and $D_5$ and is impressed on transducer $T_2$ as indicated at $Z_1$, in curve II between ordinates $c$ and $d$. The signal pulse is transmitted also over the path $D_6$, $D_7$, $D_8$ and again received by the transducer $T_2$ as indicated at $Z_2$ between ordinates $d$ and $e$. Other echoes as indicated at $Z_3$ between ordinates $e$ and $f$ may be picked up by the transducer $T_2$. The effect of all these echoes is negatived in accordance with this invention by cutting off, at point $c$, the amplifier which amplifies the signals picked up by the transducer $T_2$, representing the end of the directly received pulses. Thus the pulses utilized by the amplifier are only those which are directly received over path $D_1$ and the output of the amplifier will be as shown in curve III.

Either the transducer $T_1$ or transducer $T_2$ may be a projector and the other will be a hydrophone receiver. However $T_1$ will in general be the one under test as it is this transducer which may be rotated to permit making a directional response pattern. If a projector is under test and mounted at $T_1$, then usually $T_2$ will be a standard projector or hydrophone. However, it may be that the projector under test is mounted at $T_2$ and a standard hydrophone or projector is mounted at $T_3$ and then the transmission of the projector under test is compared with the transmission of the standard projector by comparing their effects upon a receiving projector or hyrophone mounted at $T_1$ and directed to face directly at $T_2$ or $T_3$ respectively. More specifically the various testing combinations may be tabulated as follows:

*Directional response patterns*

Projector under test as transmitter:
   $T_1$—Projector under test
   $T_2$—Hydrophone Projector under test as receiver:
   $T_1$—Projector under test
   $T_2$—Transmitting projector

*Receiving response measurements*

Projector under test as receiver:
   $T_1$—Transmitting projector
   $T_2$—Projector under test
   $T_3$—Standard hydrophone

*Transmitting response measurements*

Projector under test as transmitter
  Method #1:
   $T_1$—Receiving projector or hydrophone
   $T_2$—Projector under test
   $T_3$—Standard projector Method #2:
   $T_1$—Projector under test
   $T_2$—Calibrated hydrophone Attention is now invited to Fig. 3 which shows the general circuit arrangements for carrying out the objects of this invention. In this figure the transmitter may be connected by means of the switching arrangement 53 to actuate either one of the transducers $T_1$, $T_2$, or $T_3$, located as described in tank $t$, and similarly the receiver may be connected to $T_2$ or $T_3$ or to $T_1$. Both the transmitter and the receiver are controlled by the keying pulse generator and their outputs are compared by use of the voltmeter. The transmitter, receiver, and voltmeter may be of suitable construction, the details of which constitute no part of this invention so that they need not be further described here. However attention is particularly invited to the construction and operation of the keying pulse generator which will be described in detail. For this purpose attention is now invited to Fig. 4 which shows the circuit of said keying pulse generator. In this figure, attention is first invited to the triggering pulse generator, comprising the tube 1 and its associated circuits. The gas filled rectifier tube 1 has its grid 2 supplied with 60 cycle A. C. impulses from half of the secondary winding 3 of the transformer 4, coupled to said grid through the condenser 5. The grid input circuit is completed to the center top of the coupling 3 through the condenser 8 and resistor 14. The negative grid bias is supplied by the bias battery 7 bypassed by the condenser 8 and connected to the grid through the grid leak resistor 6. The plate 9 is supplied with its high potential voltage by the high capacity condenser 10 which in turn is supplied by the B-battery 11 through the high fixed resistance resistor 12 and variable resistor 13 connected in series. If the total resistance 12—13 is low enough, enough current can pass to charge the condenser 10 to a potential which will fire the tube each time a positive pulse is impressed on the grid, or in other words 60 times per second. When, however, the included resistance of 13 is increased slightly, condenser 10 will not have enough of a charge to permit firing the tube each cycle. It will fire the next time that the grid goes positive after 10 has reached high enough voltage. It will therefore fire every other time or at a rate of thirty cycles per second. If the resistance of 12—13 is further increased, condenser 10 will charge still more slowly and the tube will fire only once each 3 cycles or at a rate of twenty cycles per second. Still more increase of resistance of 13 will give a triggering pulse of fifteen cycles per second.

Each time the tube 1 fires, a surge of current will pass through the resistance 14 which will raise the voltage of cathode 15 of the tube. The cathode is connected to the grid 21 of the normally conducting pentode 20, which tube is a class A amplifier tube, and thus supplies it with a positive triggering pulse. Through the plate resistor 22 will pass an amplified current having a sharp peak at a rate of 15, 20, 30 or 60 times per second, depending upon the setting of the resistor 13 in the output circuit of tube 1. This will invert the triggering pulse and will cause a decrease in plate voltage. The voltage fluctuation which will thus exist across the output resistance 22, comprises an amplified negative triggering pulse which will be supplied across the condenser 24 to the input grid 31 of the twin triode 30.

The rate of recurrence of the pulse thus generated is selected to give the reverberations time to decrease to below a predetermined level before a new pulse is sent out.

Thus the grid 31 of this tube will become negative at a rate of 60, 30, 20 or 15 times per second. This will bias the first triode to cut-off at the commencement of each depression. Since the first triode is normally conducting there is a heavy current across the cathode resistor 32 and the cathode is at a considerable voltage above ground. When the grid swings negative, the voltage of the cathodes 33 and 34 relative to ground will drop and the grid 35 will be raised relative to ground so that the second triode will become conducting or more conducting if already conducting. This causes the voltage on the plate 36 to be lowered.

By means of condenser 38 the negative pulse thus produced is supplied to resistor 39 and causes a further lowering of the voltage on the grid 31. The current through the second section of the triode will continue until the negative charge leaks off the condensers 24 and 38. The time required to do this will vary and may be controlled by means of the variable resistor 29. The fluctuations of voltage across resistor 32 are supplied to grid 41 of twin triode tube 40.

Each half of twin triode tube 40 is connected as two class A amplifiers. The amplified voltage from the first section exists across resistor 42 and is also supplied through condenser 54 to tube 50 which is similar to the twin triode 30. The operation of 50 and its associated circuits is the same as 30 but grid 51 will go negative when the grid 31 has returned to its normal voltage and the plate current of the second section of tube 30 has stopped. Thus the voltage across resistor 52 will decrease when that across resistor 32 increases as the current begins to flow in the first section of 30. The length of the negative pulses is controlled by means of resistor 49. In this way the negative keying pulses on 44 will commence as those on 41 end.

It will be clear then that the surges across 42 will be followed by the similar surge across 43 and that both these surges are adjustable in length and are positive in character. The resistive impedances 42 and 43 are coupled to resistors 45 and 46 through coupling condensers 47 and 48 respectively together with the bias battery from the return circuit for the suppressor grids in the transmitter and receiver. These grids are normally biased to cutoff but are raised to operating potential for the duration of the positive keying pulse.

In this manner there is developed across contacts X and Z (Figs. 3 and 4) a keying pulse voltage for the transmitter the length of which pulses as well as the frequency, can be varied as desired. Also with switch 60 on contact Y there may be developed across contacts Q and Z' a keying pulse voltage for the receiver which is the same as that across contacts X and Z or selectively with switch 60 on contact X' a second keying pulse voltage which is of the same frequency as that developed across X and Z but commencing upon the termination of a keying pulse across X and Z and the length of which may be independently adjusted as desired.

The voltages at various portions of the circuit of Fig. 4 are shown in Fig. 5 to which attention is now directed. Curve A shows the 60 cycle A. C. voltage applied to the input of tube 1. It will be noted that there are indicated on this curve several points representing the firing points of tube 1 for different settings of potentiometer 13, giving 60 cycles, 30 cycles, 20 cycles or 15 cycles. The remainder of the curves in Fig. 5 are drawn on the supposition that potentiometer 13 is set to cause tube 1 to fire once each four cycles of the A. C. input or at the rate of 15 times per second.

The triggering pulse voltage impressed on the grid 21 of tube 20 is shown as curve B and, since the circuit of tube 20 reverses the phase of the input voltage, the curve C shows the same triggering pulses voltage, though reversed and somewhat amplified, as applied to the input grid 31 of tube 30.

The negative keying pulses produced in the cathode circuit of 30 are shown in curve D. It will be understood that the length $Lx$ of these pulses is controlled by the resistor 29. The similar negative pulses produced in the cathode circuit of 50 are shown in curve E. The length $Lq$ of these pulses is controlled by the setting of resistor 49.

The reversed or positive keying pulses existing across the terminals X—Z is shown in curve F. When switch 60 is closed on X' the voltage across Q—Z' will be the same.

The keying pulses existing across terminals Q—Z' when the switch 60 is closed on contact Y is shown in curve G.

Having thus described this invention, attention is called to the fact that this application is not to be limited to the specific embodiment shown and described for the purposes of illustration but by the actual scope of the invention as set forth in the following claims. It is specifically pointed out that this invention is particularly adapted for use in testing of sound reproducers, loud speakers and microphones.

The invention described herein may be manufactured and used by or for the Government of the United States of America for governmental purposes without the payment of any royalties thereon or therefor.

I claim:

1. In the testing of an underwater sound transducer, by the use of a second underwater sound transducer, both being submerged in a water-filled testing tank, the method of testing which comprises positioning said transducers as far apart in said tank as will permit the earliest reflected sound wave transmitted by one of said transducers to arrive at said second transducer enough after the directly transmitted waves to permit said directly transmitted waves to make a sensible impression upon said second transducer before the arrival of said reflected sound waves, applying a driving energy to one of said transducers, measuring the energy applied to said transducer, receiving by the second transducer the energy directly transmitted by said first transducer, measuring the received energy, comparing the energy transmitted and the energy received, keying said driving energy to permit the transmission of a sensible signal and keying reception to receive said directly transmitted signals and to cut off before the reflected signals arrive at said second transducer.

2. In the testing of an underwater sound transducer, by the use of a second underwater sound transducer, both being submerged in a water-filled testing tank, the method of testing which comprises positioning said transducers as far apart as will permit the earliest reflected sound waves transmitted by one of said transducers to arrive at the other said transducer enough after the directly transmitted wave to permit said directly transmitted wave to make a sensible impression upon said other transducer before the arrival of said reflected sound waves, applying a driving energy to one of said transducers to transmit a sound pulse, receiving by the second transducer the sound pulse directly transmitted by said first transducer, comparing the energy transmitted and the energy received, and keying said transducers whereby said first transducer will transmit a series of pulses and said second transducer will be excited to receive the directly transmitted pulses but will be cut off after receipt of each pulse and before the arrival of a reflected sound pulse.

3. In the testing of an underwater sound transducer by the use of a second underwater sound transducer, both being submerged in a water-filled testing tank, the method of testing which includes positioning said transducers as far apart as will permit the earliest reflected sound waves transmitted by one of said transducers to arrive at the other said transducer enough after the directly transmitted wave to permit said directly transmitted wave to make a sensible impression upon said other transducer before the arrival of said reflected sound waves, applying a series of short signal pulses of driving energy to one of said transducers to produce short signal pulses of sound waves, connecting said second transducer to receive said signal pulses at a corresponding series of short periods, adjusting the length of said signal pulses to produce a sensible signal in said second transducer, and adjusting the length of the said periods of connection to permit reception of the directly projected signal pulses but to cut off before the arrival at said second transducer of any signal pulses reflected from the wall of the tank whereby only the directly transmitted signal pulses are considered.

4. In the testing of an underwater sound transducer by the use of a second underwater sound transducer, both being submerged in a water-filled testing tank, the method of testing which includes positioning said transducers as far apart as will permit the earliest reflected sound waves transmitted by one of said transducers to arrive at the other said transducer enough after the directly transmitted wave to permit said directly transmitted wave to make a sensible impression upon said other transducer before the arrival of said reflected sound waves, applying a series of short pulses of driving energy to one of said transducers to project short signal pulses of sound waves, connecting said second transducer to receive said signal pulses at a corresponding series of short periods, adjusting the length of said signal pulses to produce a sensible signal in said second transducer, adjusting the length of the said periods to permit reception of the directly projected signal pulses but to cut off before the arrival at said second transducer of any signal pulses reflected from the wall of the tank whereby only the directly transmitted pulses are considered, and changing the horizontal angle of setting of the one of said transducers which is under test to obtain a directional response pattern of said transducer.

5. In the testing of an underwater sound transducer by the use of a second underwater sound transducer, both being submerged in a water-filled testing tank, the method of testing which comprises positioning said transducers as far apart as will permit the earliest reflected sound waves transmited by one of said transducers to arrive at the other said transducer enough after the directly transmitted wave to permit said directly transmitted wave to make a sensible impression upon said other transducer before the arrival of said reflected sound waves, applying a driving energy to one of said transducers, receiving by the second transducer the energy directly transmitted by said first transducer, keying said transducers whereby said first transducer will transmit a series of pulses of sound waves and the said second transducer will be connected for reception of the directly transmitted pulses but will be cut off before the arrival of the reflected sound pulses, changing the horizontal bearing angle of one of said transducers, and comparing the energy transmitted and the energy received for each angular setting whereby a directional response pattern of said transducer may be determined.

6. In the testing of an underwater sound transducer by the use of a second underwater transducer, both being submerged in a water-filled testing tank, the method of testing which comprises positioning said transducers as far apart as will permit the earliest reflected sound waves transmitted by one of said transducers to arrive at the other said transducer enough after the directly transmitted wave to permit said directly transmitted wave to make a sensible impression upon said other transducer before the arrival of said reflected sound waves, applying a driving energy to one of said transducers to project sound waves, receiving by the second transducer the energy directly transmitted by the said first transducer, changing the horizontal angle of one of said transducers, step by step, comparing the energy transmitted and the energy received for each of said angles to produce a directional response pattern, keying said driving energy to permit the transmission of a sensible signal and keying said reception to receive said directly transmitted pulses but to cut off before reflected signals arrive at said second transducer.

7. In the testing of an underwater sound transducer, by the use of a second underwater sound transducer both being submerged in a water-filled testing tank, the method of testing which comprises positioning said transducers as far apart in said tank as will permit the earliest reflected sound waves transmitted by one of said transducers to arrive at said second transducer enough after said directly transmitted waves to permit the directly transmitted waves to make a sensible impression upon said second transducer before the arrival of said reflected sound waves, applying a driving energy to one of said transducers, measuring the energy applied to said transducer, receiving by the second transducer the energy directly transmitted by said first transducer, measuring the received energy, changing the horizontal angle of one of said transducers, step by step, comparing the energy transmitted and the energy received for each of said angles to produce a directional response pattern, keying said driving energy to permit the transmission of a sensible signal and keying said reception to receive said directly transmitted signals and to cut off before reflected signals arrive at said second transducer.

8. In combination, apparatus for testing the performance of an underwater sound transducer, comprising a water-filled testing tank for containing immersed therein the underwater sound transducer, the characteristics of which it is desired to test, a testing sound transducer submerged in said tank and spaced from said first transducer a predetermined distance sufficient to permit a sound-wave signal pulse of given duration projected from said testing transducer to be received complete through the first transducer before the arrival of an echo from the sides of the tank, said testing transducer being mounted so that it may be rotated to permit the making of a directional response pattern, a transmitter, a receiver, means for selectively connecting said transmitter or said receiver to either said testing transducer or the transducer to be tested, a voltmeter for comparing the energy transmitted and that received, and a keying pulse generator for keying the said transmitter and said receiver, said keying pulse generator comprising means for generating a triggering pulse having a frequency of 60, 30, 20 or 15 cycles per second, means for adjusting the frequency of said triggering pulse generator, means for inverting and amplifying said triggering pulse, means for producing a negative keying pulse, means for adjusting the length of said keying pulse, means for inverting said keying pulse, means for generating a second keying pulse commencing at the end of said first keying pulse, means for adjusting the length of said last mentioned keying pulse, and means for alternatively supplying either said first mentioned or said last mentioned keying pulses to said receiver and said first mentioned keying pulses to said transmitter, whereby one of said transducers may be driven for a short period to transmit a signal and then cut off, and said receiver can be connected to receive said signals and cut off before the arrival at the second transducer of any reflected sound waves.

9. In combination apparatus for testing an underwater sound transducer comprising a water-filled testing tank for containing immersed therein the underwater sound transducer, the characteristics of which it is desired to test, a testing sound transducer submerged in said tank and spaced from said first transducer a predetermined distance sufficient to permit a sound-wave signal pulse of given duration projected from said testing transducer to be received complete through the first transducer before the arrival of an echo from the sides of the tank, said testing transducer being mounted so that it may be rotated to permit the making of a directional response pattern, a transmitter, a receiver, means for selectively connecting said transducer or said receiver to either said testing transducer or the transducer to be tested, a voltmeter for comparing the energy transmitted and that received, and keying means for keying said transmitter to transmit a signal by one of said transducers and keying said receiver in predetermined time relation to the keying of the transmitter to permit the receiver to receive the signal through the other transducer but to cut off before the arrival at said other transducer of reflected sound waves.

10. In combination, apparatus for testing an underwater sound transducer comprising a water-filled tank for containing immersed therein the underwater sound transducer the characteristics of which it is desired to test, a testing sound transducer submerged in said tank and spaced from said first transducer a predetermined distance sufficient to permit a sound-wave signal pulse of given duration projected from said testing transducer to be received complete through the first transducer before the arrival of an echo from the sides of the tank, a transmitter, a receiver, a voltmeter for comparing the energy transmitted and that received, and keying means for keying said transmitter to transmit a signal by one of said transducers and keying said receiver in predetermined time relation to the keying of the transmitter to permit the receiver to receive the signal through the other transducer but to cut off before the arrival at said other transducer of reflected sound waves.

11. In the testing of a sound transducer, by the use of a second sound transducer, both being surrounded by a sound transmitting medium in a testing enclosure, the method of testing which comprises positioning said transducers as far apart in said enclosures as will permit the earliest reflected sound waves transmitted by one of said transducers to arrive at said second transducer enough after the directly transmitted waves to permit the directly transmitted waves to make a sensible impression upon said second transducer before the arrival of said reflected sound waves, applying a driving energy to one of said transducers, measuring the energy applied to said transducer, receiving by the second transducer the energy directly transmitted by said first transducer measuring the received energy, changing the angle of one of said transducers, step by step, comparing the energy transmitted and the energy received for each of said angles to produce a directional response pattern, keying said driving energy to permit the transmission of a sensible signal, and keying said reception to receive said directly transmitted signals and to cut off before reflected signals arrive at said second transducer.

OLLIE M. OWSLEY.

REFERENCES CITED

The following references are of record in the file of this patent:

UNITED STATES PATENTS

| Number | Name | Date |
| --- | --- | --- |
| 2,105,537 | Kramar | Jan. 18, 1938 |
| 2,289,988 | Norton | July 14, 1942 |
| 2,300,999 | Williams | Nov. 3, 1942 |

FOREIGN PATENTS

| Number | Country | Date |
| --- | --- | --- |
| 469,417 | Great Britain | July 26, 1937 |